US012207064B2

(12) United States Patent
Wang

(10) Patent No.: US 12,207,064 B2
(45) Date of Patent: Jan. 21, 2025

(54) METHOD AND APPARATUS FOR CONTROLLING POWER CONSUMPTION OF SPEAKER, STORAGE MEDIUM, AND ELECTRONIC DEVICE

(71) Applicant: AAC Microtech (Changzhou) Co., Ltd., Changzhou (CN)

(72) Inventor: Hongxing Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 219 days.

(21) Appl. No.: 18/104,313

(22) Filed: Feb. 1, 2023

(65) Prior Publication Data

US 2024/0056732 A1 Feb. 15, 2024

Related U.S. Application Data

(63) Continuation of application No. PCT/CN2022/122053, filed on Sep. 28, 2022.

(30) Foreign Application Priority Data

Aug. 11, 2022 (CN) ......................... 202210959996.3

(51) Int. Cl.
*H04R 29/00* (2006.01)
*H04R 1/08* (2006.01)
*H04R 3/04* (2006.01)
*H03G 3/20* (2006.01)

(52) U.S. Cl.
CPC ................ *H04R 3/04* (2013.01); *H04R 1/08* (2013.01)

(58) Field of Classification Search
CPC .................................... H04R 3/04; H04R 1/08
USPC ..................................................... 381/56, 57
See application file for complete search history.

(56) References Cited

FOREIGN PATENT DOCUMENTS

CN 110022515 A * 7/2019

* cited by examiner

*Primary Examiner* — Ammar T Hamid
(74) *Attorney, Agent, or Firm* — W&G Law Group

(57) ABSTRACT

Provided are a method and an apparatus for controlling power consumption of a speaker, a storage medium, and an electronic device. The method includes: acquiring environment state information through an environment information acquisition device; analyzing the environment state information through an environment state analysis module to generate an environment state result; receiving a mode selection result input by a user; generating a power consumption control parameter through a power consumption parameter calculation module according to the environment state result and the mode selection result; and controlling power consumption of a speaker through a power consumption suppression module according to the power consumption control parameter. In this way, the power consumption of the speaker can be dynamically controlled, thereby further saving the power consumption.

9 Claims, 9 Drawing Sheets

METHOD AND APPARATUS FOR CONTROLLING POWER CONSUMPTION OF SPEAKER, STORAGE MEDIUM, AND ELECTRONIC DEVICE

TECHNICAL FIELD

The present invention relates to the technical field of speakers, and in particular, to a method and an apparatus for controlling power consumption of a speaker, a storage medium, and an electronic device.

BACKGROUND

The battery life of an electronic device is an aspect that consumers pay more and more attention to. In order to improve the battery life of the electronic device, it is not enough to just use a high-capacity battery, and there is also a need to control power consumption of each module in the electronic device. For example, for a display screen, in order to reduce the power consumption of the screen, operations such as reducing brightness of the screen and reducing a refresh rate of the screen may be performed.

Using a speaker of the electronic device may also lead to power consumption. During the design of the electronic device, power consumption of the speaker may generally be limited. However, the power consumption of the speaker cannot be dynamically controlled in the related art.

SUMMARY

In view of the above, embodiments of the present invention provide a method and an apparatus for controlling power consumption of a speaker, a storage medium, and an electronic device, which can dynamically control power consumption of a speaker, thereby further saving power consumption.

In an aspect, an embodiment of the present invention provides a method for controlling power consumption of a speaker, the method including: acquiring environment state information through an environment information acquisition device; analyzing the environment state information through an environment state analysis module to generate an environment state result; receiving a mode selection result input by a user; generating a power consumption control parameter through a power consumption parameter calculation module according to the environment state result and the mode selection result; and controlling power consumption of the speaker through a power consumption suppression module according to the power consumption control parameter.

In another aspect, an embodiment of the present invention provides an apparatus for controlling power consumption of a speaker, the apparatus including: an acquisition module configured to acquire environment state information through an environment information acquisition device; an environment state analysis module configured to analyze the environment state information to generate an environment state result; a receiving module configured to receive a mode selection result input by a user; a power consumption parameter calculation module configured to generate a power consumption control parameter according to the environment state result and the mode selection result; and a power consumption suppression module configured to control power consumption of a speaker according to the power consumption control parameter.

In another aspect, an embodiment of the present invention provides an electronic device, including a memory and a processor. The memory is configured to store information including program instructions, and the processor is configured to control execution of the program instructions. When the program instructions are loaded and executed by the processor, steps of the method for controlling power consumption of the speaker described above are implemented.

BRIEF DESCRIPTION OF DRAWINGS

In order to more clearly illustrate the technical solutions in the embodiments of the present invention, the accompanying drawings used in the description of the embodiments will be briefly introduced below. It should be noted that, the accompanying drawings in the following description are merely some embodiments of the present invention, and other drawings can be obtained by those of ordinary skill in the art from the provided drawings without creative efforts.

DESCRIPTION OF EMBODIMENTS

In order to better illustrate the technical solutions of the present invention, the embodiments of the present invention are described in detail below with reference to the accompanying drawings.

It should be noted that the embodiments described herein are merely some rather than all of the embodiments of the present invention. All other embodiments acquired by those of ordinary skill in the art without creative efforts based on the embodiments of the present invention fall within a scope of the present invention.

The terms used in the embodiments of the present invention are intended only to describe particular embodiments and are not intended to limit the present invention. As used in the embodiments of the present invention and the appended claims, the singular forms of "a/an", "said", and "the" are intended to also include plural forms, unless otherwise clearly specified by the context.

It should be understood that the term "and/or" used herein is merely an association relationship describing associated objects, indicating that three relationships may exist. For example, A and/or B indicates that there are three cases: A alone, A and B together, and B alone. In addition, the character "/" herein generally means that associated objects before and after it are in an "or" relationship.

Figure 1:
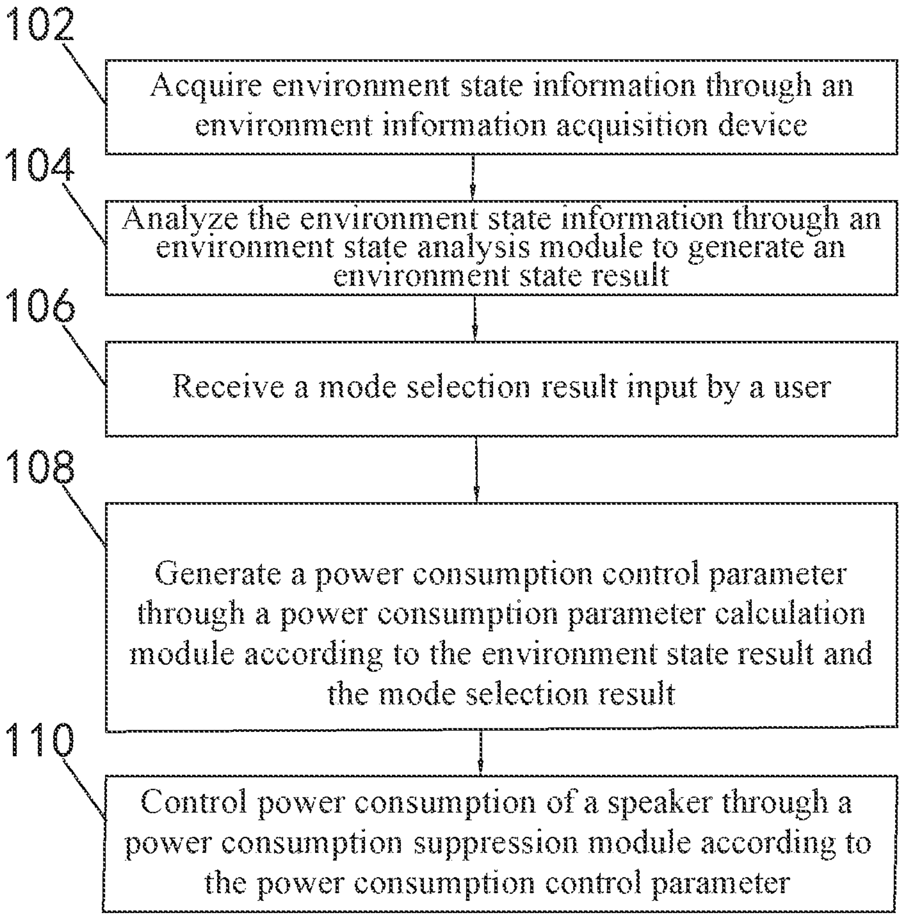
FIG. 1 is a flow chart of a method for controlling power consumption of a speaker according to an embodiment of the present invention.
Figure 2:
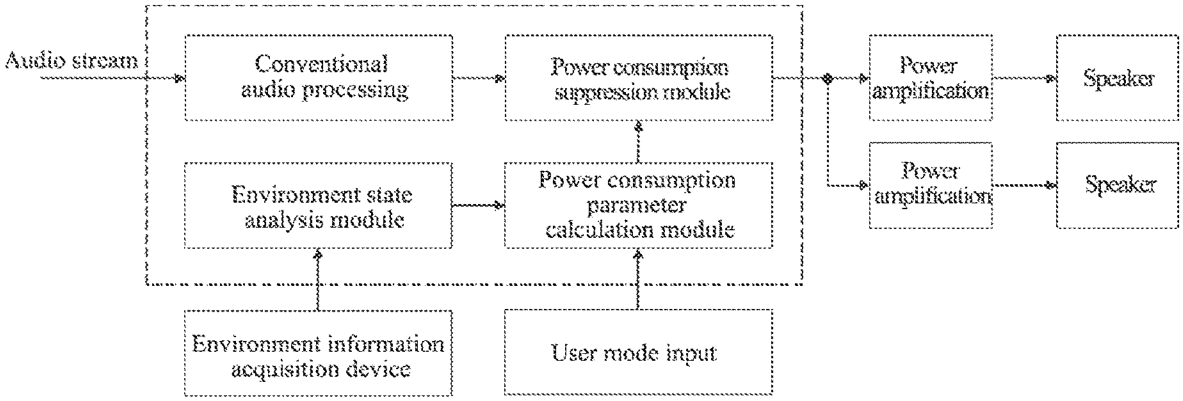
FIG. 2 is a schematic diagram of a method for controlling power consumption of a speaker according to an embodiment of the present invention.
Figure 3:
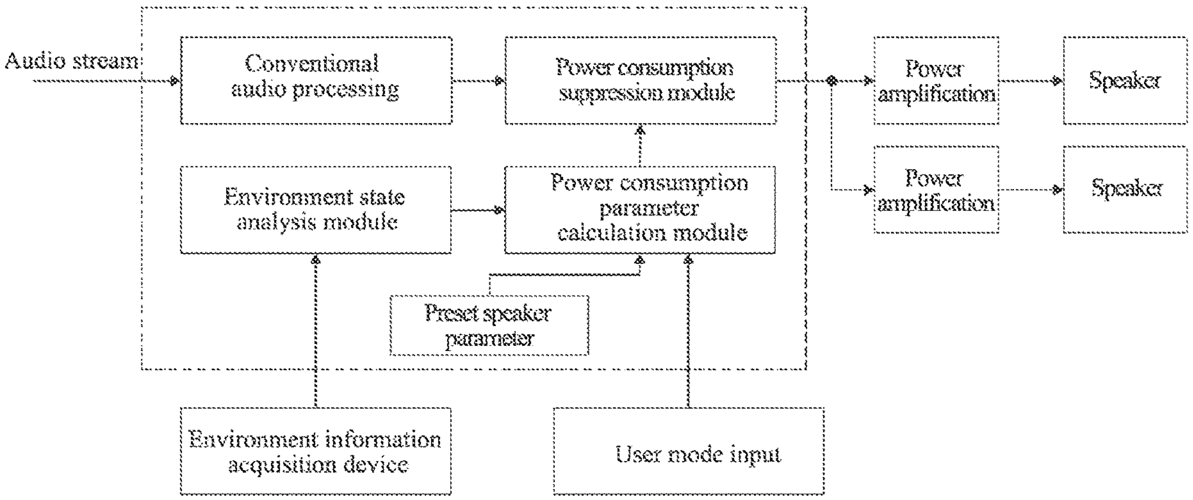
FIG. 3 is a schematic diagram of another method for controlling power consumption of a speaker according to an embodiment of the present invention.

An embodiment of the present invention provides a method for controlling power consumption of a speaker. FIG. 1 is a flow chart of a method for controlling power consumption of a speaker according to an embodiment of the present invention, FIG. 2 is a schematic diagram of a method for controlling power consumption of a speaker according to an embodiment of the present invention, and FIG. 3 is a schematic diagram of another method for controlling power consumption of a speaker according to an embodiment of the present invention. As shown in FIG. 1, FIG. 2 or FIG. 3, the method includes the following steps.

In step 102, environment state information is acquired through an environment information acquisition device.

In the embodiments of the present invention, the steps are performed by an electronic device. For example, the electronic device includes a mobile phone, a tablet computer, a computer, or a wearable device.

In the embodiments of the present invention, prior to step 102, the method further includes acquiring an audio stream, and performing conventional audio processing on the audio stream to generate a processed audio stream.

In the embodiments of the present invention, the environment information acquisition device includes a microphone, a light sensor, or a temperature sensor.

In the embodiments of the present invention, the environment state information includes environment sound information, environment light brightness information, or environment temperature information.

For example, the environment sound information is acquired through the microphone, the environment light brightness information is acquired through the light sensor, and the environment temperature information is acquired through the temperature sensor.

In step 104, the environment state information is analyzed through an environment state analysis module to generate an environment state result.

In the embodiments of the present invention, the environment state result includes a low-frequency noise level of an environment. For example, the environment sound information is analyzed through the environment state analysis module to generate the low-frequency noise level of the environment.

In step 106, a mode selection result input by a user is received.

In this step, the user inputs the mode selection result. For example, the mode selection result includes a performance mode, a balance mode, or a power saving mode.

In step 108, a power consumption control parameter is generated through a power consumption parameter calculation module according to the environment state result and the mode selection result.

In an example, the power consumption control parameter is generated through the power consumption parameter calculation module according to a preset speaker parameter, the environment state result, and the mode selection result.

As an optional solution, a power consumption control parameter corresponding to a mode selection result is generated based on a sound masking effect model in combination with the mode selection result selected by the user.

In the embodiments of the present invention, the power consumption control parameter includes a high-pass filter cutoff frequency parameter. The high-pass filter cutoff frequency parameter is adjustable. For example, the setting of the high-pass filter cutoff frequency parameter is generated by the power consumption control parameter calculation module.

For example, in the power saving mode, the high-pass filter cutoff frequency parameter is set to 600 Hz, and then the speaker only outputs signals above 600 Hz. Since power consumption of a micro speaker accounts for a large proportion in a low frequency band, such an operation will greatly reduce the power consumption of the micro speaker, having a typical value that saves 50%, thereby achieving a power saving effect.

In step 110, power consumption of a speaker is controlled through a power consumption suppression module according to the power consumption control parameter.

In the embodiments of the present invention, the power consumption suppression module includes a high-pass filter.

In the embodiments of the present invention, power consumption of the processed audio stream may be controlled through the power consumption suppression module according to the power consumption control parameter, so that the speaker can perform power amplification according to the power consumption control parameter, and the power consumption of the speaker can be reduced.

Figure 4:
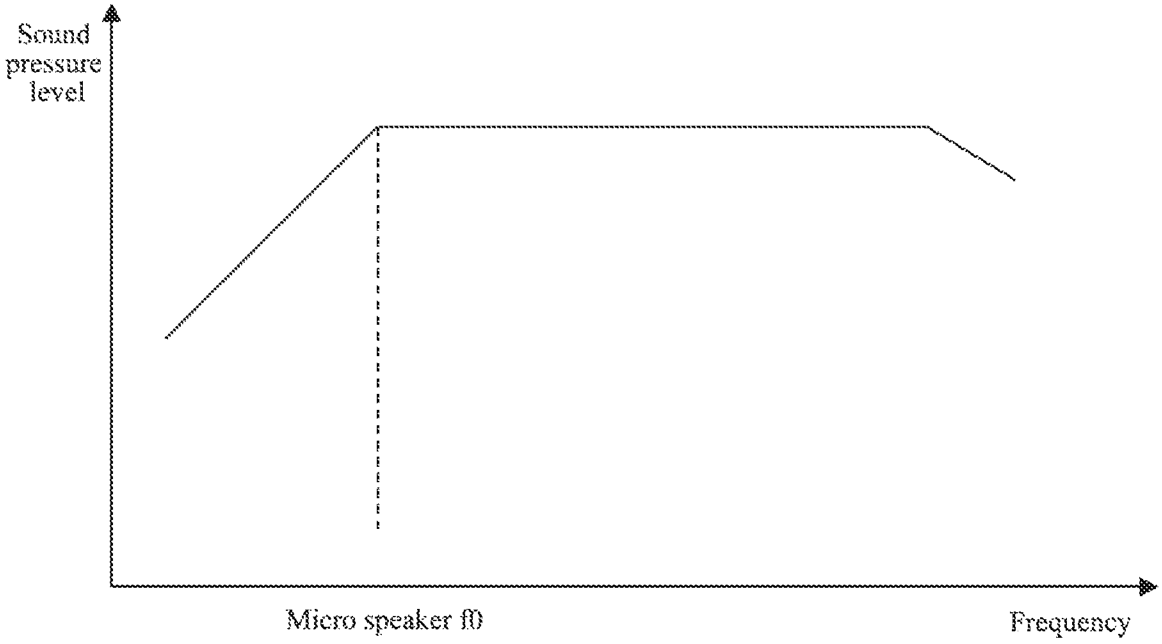
FIG. 4 is a schematic diagram of a typical frequency response curve of a micro speaker.
Figure 5:
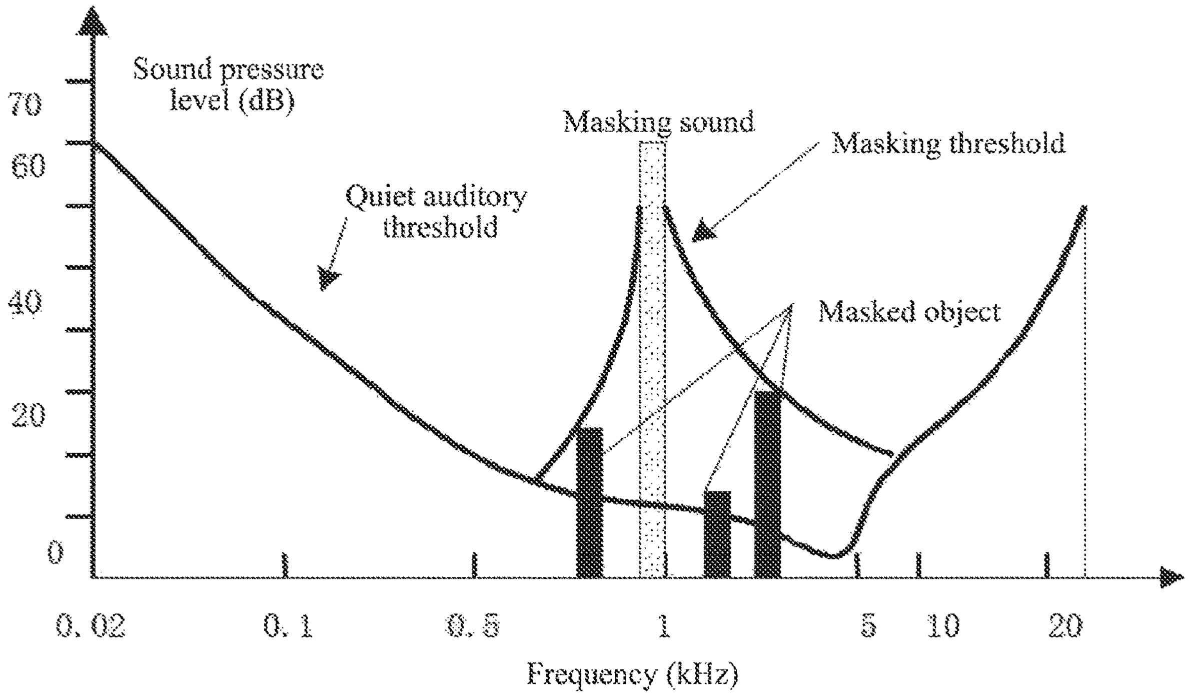
FIG. 5 is a schematic diagram of a masking effect of sound.

In the embodiments of the present invention, it is well known that intensity of low-frequency noise in a noisy environment is very high. For example, for noise reduction headphones, the noise that is reduced is mainly low-frequency noise. FIG. 4 is a schematic diagram of a typical frequency response curve of a micro speaker, and FIG. 5 is a schematic diagram of a masking effect of sound. As shown in FIG. 4, for a micro speaker used in an electronic device, it is also well known that a low-frequency response of the micro speaker is relatively weak. This means that the low-frequency response is inadequate until a micro speaker f0 (resonant frequency), moreover, the lower the frequency, the lower the sound pressure level. For a micro speaker, a typical value of the micro speaker f0 may be around 800 Hz. As shown in FIG. 5, due to the existence of the "masking effect", it is known that when low-frequency loudness is high in external sound, low-frequency sound with low loudness output by the micro speaker of the electronic device may be easily masked.

Figure 6:
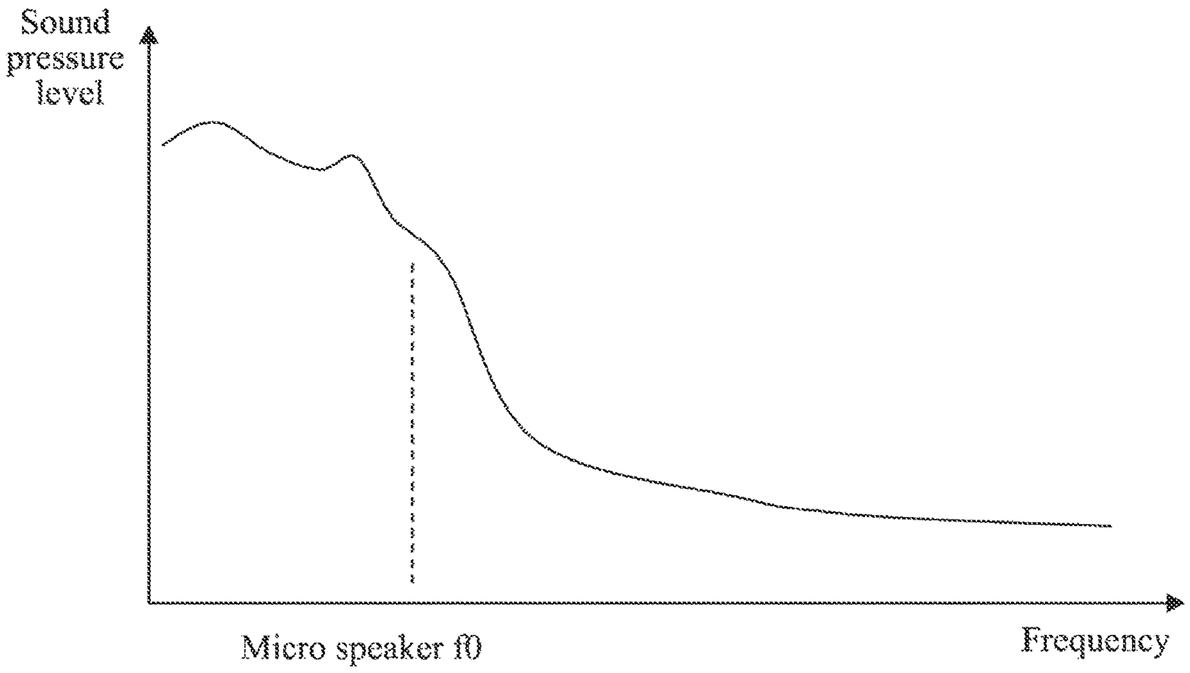
FIG. 6 is a schematic diagram of a low-frequency noise spectrum in environment noise.

In the embodiments of the present invention, FIG. 6 is a schematic diagram of a low-frequency noise spectrum in environment noise. As shown in FIG. 6, in a noisy environment with a lot of low-frequency noise, when a loudspeaker mode is used for playing music, low-frequency components played by the speaker may be reduced. In this way, use experience in such environment scenarios is not affected (because low-frequency sound from the speaker cannot be effectively heard anyway in such scenarios), and unnecessary power consumption can be avoided to a large extent. The low-frequency noise spectrum in the environment noise in FIG. 6 may be the environment state result generated in step 104.

Figure 7:
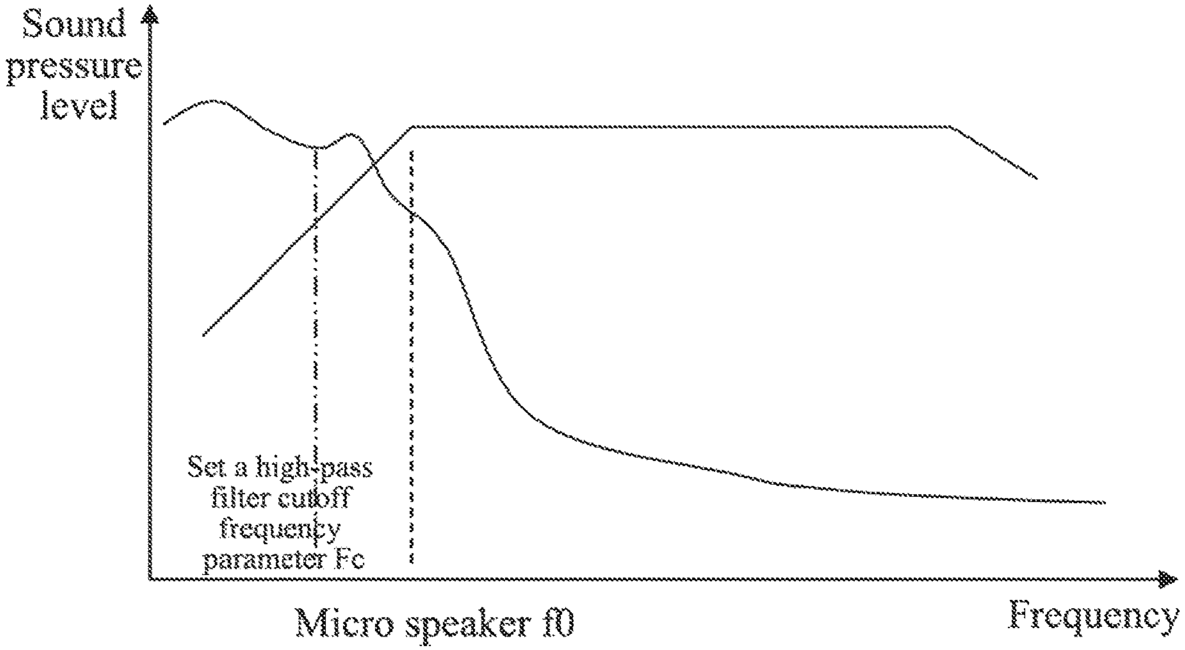
FIG. 7 is a schematic application diagram of a method for controlling power consumption of a speaker according to an embodiment of the present invention.

In the embodiments of the present invention, FIG. 7 is a schematic application diagram of a method for controlling power consumption of a speaker according to an embodiment of the present invention. By comparing the low-frequency noise spectrum in the environment noise shown in FIG. 6 with the typical frequency response curve of the micro speaker shown in FIG. 4, it can be seen that low-frequency output of the micro speaker is easily masked by low-frequency components in the environment noise, as a result, the low-frequency sound produced by the micro speaker cannot be heard.

In the technical solution according to the embodiments of the present invention, environment state information is acquired through an environment information acquisition device, the environment state information is analyzed through an environment state analysis module to generate an environment state result, a mode selection result input by a user is received, a power consumption control parameter is generated through a power consumption parameter calculation module according to the environment state result and the mode selection result, and power consumption of a speaker is controlled through a power consumption suppression module according to the power consumption control parameter. In the technical solution according to the embodiments of the present invention, the power consumption control parameter is generated through he power consumption parameter calculation module according to the environment state result and the mode selection result, and power consumption of the speaker is controlled through the power consumption suppression module according to the power consumption control parameter, so that the power consumption of the speaker can be dynamically controlled, thereby further saving the power consumption.

Figure 8:
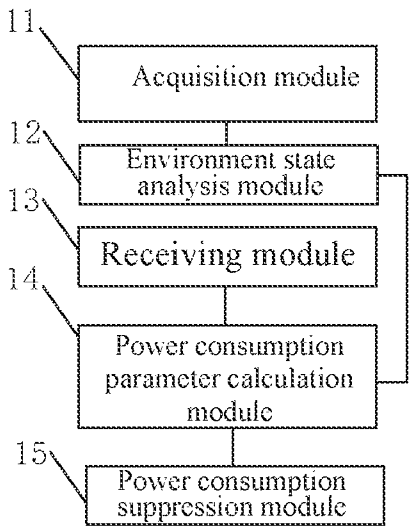
FIG. 8 is a schematic structural diagram of a apparatus for controlling power consumption of a speaker according to an embodiment of the present invention.

An embodiment of the present invention provides an apparatus for controlling power consumption of a speaker apparatus. FIG. 8 is a schematic structural diagram of an apparatus for controlling power consumption of a speaker according to an embodiment of the present invention. As shown in FIG. 8, the apparatus includes: an acquisition module 11, an environment state analysis module 12, a receiving module 13, a power consumption parameter calculation module 14, and a power consumption suppression module 15.

The acquisition module 11 is configured to acquire environment state information through an environment information acquisition device.

The environment state analysis module 12 is configured to analyze the environment state information to generate an environment state result.

The receiving module 13 is configured to receive a mode selection result input by a user.

The power consumption parameter calculation module 14 is configured to generate a power consumption control parameter according to the environment state result and the mode selection result.

The power consumption suppression module 15 is configured to control power consumption of a speaker according to the power consumption control parameter.

In this embodiment of the present invention, the power consumption parameter calculation module 14 is configured to generate the power consumption control parameter according to a preset speaker parameter, the environment state result, and the mode selection result.

In this embodiment of the present invention, the power consumption suppression module includes a high-pass filter.

In this embodiment of the present invention, the environment information acquisition device includes a microphone.

In this embodiment of the present invention, the environment state information includes environment sound information, environment light brightness information, or environment temperature information.

In this embodiment of the present invention, the environment state result includes a low-frequency noise level of an environment.

In this embodiment of the present invention, the power consumption control parameter includes a high-pass filter cutoff frequency parameter.

In the technical solutions according to the embodiments of the present invention, environment state information is acquired through an environment information acquisition device, the environment state information is analyzed through an environment state analysis module to generate an environment state result, a mode selection result input by a user is received, a power consumption control parameter is generated through a power consumption parameter calculation module according to the environment state result and the mode selection result, and power consumption of a speaker is controlled through a power consumption suppression module according to the power consumption control parameter. In the technical solutions according to the embodiments of the present invention, the power consumption control parameter is generated by the power consumption parameter calculation module according to the environment state result and the mode selection result, and power consumption of the speaker is controlled through the power consumption suppression module according to the power consumption control parameter, so that the power consumption of the speaker can be dynamically controlled, thereby further saving the power consumption.

The apparatus for controlling power consumption of the speaker according to the embodiments may be configured to implement the method for controlling power consumption of the speaker in FIG. 1. The descriptions can be obtained with reference to the foregoing embodiments of the method for controlling power consumption of the speaker, and details are not repeated herein.

An embodiment of the present invention provides a storage medium. The storage medium includes a stored program. When the program runs, a device where the storage medium is located is controlled to perform steps of the method for controlling power consumption of the speaker in the foregoing embodiments. The descriptions can be obtained with reference to the method for controlling power consumption of the speaker in the foregoing embodiments.

An embodiment of the present invention provides an electronic device, including a memory and a processor. The memory is configured to store information including program instructions. The processor is configured to control execution of the program instructions. When the program instructions are loaded and executed by the processor, steps of the method for controlling power consumption of the speaker in the foregoing embodiments are implemented. Specific descriptions can be obtained with reference to the method for controlling power consumption of the speaker in the foregoing embodiments.

Figure 9:
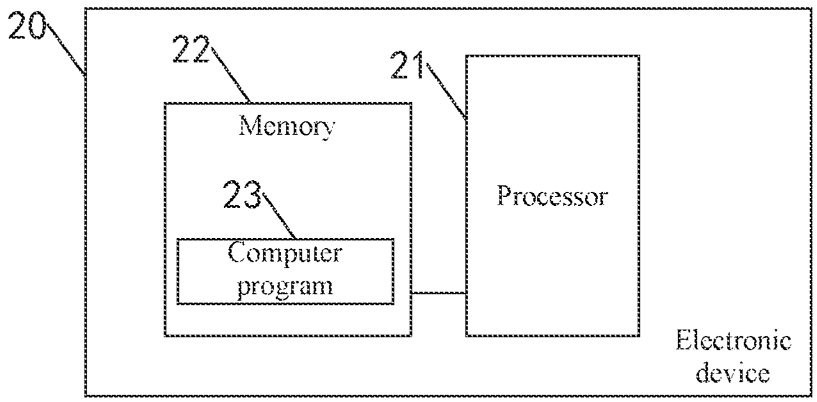
FIG. 9 is a schematic diagram of an electronic device according to an embodiment of the present invention.

FIG. 9 is a schematic diagram of an electronic device according to an embodiment of the present invention. As shown in FIG. 9, an electronic device 20 according to this embodiment includes: a processor 21, a memory 22, and a computer program 23 stored in the memory 22 and executable by the processor 21. When the computer program 23 is executed by the processor 21, the method for controlling power consumption of the speaker in the embodiments is implemented. Details are not repeated herein to avoid repetition. Alternatively, when the computer program is executed by the processor 21, functions of models/units in the apparatus for controlling power consumption of the speaker in the embodiments are implemented/achieved. Details are not repeated herein to avoid repetition.

The electronic device 20 includes, but is not limited to, the processor 21 and the memory 22. Those skilled in the art may understand that, FIG. 9 is merely an example of the electronic device 20 and does not constitute a limitation on the electronic device 20, which may include more or fewer components than those illustrated, or combine some components, or include different components. For example, the electronic device may further include an input/output device, a network access device, a bus, and the like.

The processor 21 may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional/general processor or the like.

The memory 22 may be an internal storage unit of the electronic device 20, such as a hard disk or memory of the electronic device 20. The memory 22 may also be an external storage device of the electronic device 20, such as a plugged hard disk, a smart media card (SMC), a secure digital (SD) card, a flash memory card, or the like, which may be provided on the electronic device 20. Further, the memory 22 may also include both an internal storage unit and an external storage unit of the electronic device 20. The memory 22 is configured to store computer programs and other programs and data required by the electronic device. The memory 22 may also be configured to temporarily store data that has been or will be outputted.

It may be clearly understood by those skilled in the art that, for the purpose of convenient and brief description, detailed operating processes of the system, apparatus, and unit described above may be obtained with reference to the corresponding process in the foregoing method embodiments. Details are not repeated herein.

In some embodiments provided in the present invention, it should be understood that the disclosed system, apparatus, and method may be implemented in other manners. For example, the described apparatus embodiments are merely examples. For example, the division of units is merely logical function division and may be other division in actual implementation. For example, a plurality of units or components may be combined or integrated into another system, or some features may be ignored or not performed. In addition, the mutually coupling or directly coupling or communication connection may be implemented through some interfaces. The indirectly coupling or communication connection between the apparatuses or units may be implemented in electronic, mechanical, or other forms.

The units described as separate parts may be or may not be physically separate, and parts displayed as units may be or may not be physical units, may be located at one position, or may be distributed on a plurality of network units. Some or all of the units may be selected based on actual requirements to achieve the objective of the solution of this embodiment.

In addition, functional units in the embodiments of the present invention may be integrated into one processing unit, or each of the units may exist alone physically, or two or more units are integrated into one unit. The integrated unit may be implemented in a form of hardware or in a form of hardware plus a software function unit.

The integrated unit implemented in the form of the software function unit may be stored in a computer-readable storage medium. The software function unit is stored in a storage medium, and includes several instructions for instructing a computer device (which may be a personal computer, a server, a network device, or the like) or a processor to perform all or some of the steps of the methods described in the embodiments of the present invention. The foregoing storage medium includes any medium that can store program codes, such as a USB flash drive, a removable hard disk, a read-only memory (ROM), a random access memory (RAM), a magnetic disk, or an optical disc.

The foregoing descriptions are merely preferred embodiments of the present invention, but are not intended to limit the present invention. Any modification, equivalent replacement, improvement, and the like made within a concept of the present invention shall fall within a scope of the present invention.

What is claimed is:

1. A method for controlling power consumption of a speaker, the method comprising:

acquiring environment state information through an environment information acquisition device;

analyzing the environment state information through an environment state analysis module to generate an environment state result;

receiving a mode selection result input by a user;

generating a power consumption control parameter through a power consumption parameter calculation module according to the environment state result and the mode selection result; and controlling power consumption of the speaker through a power consumption suppression module according to the power consumption control parameter.

2. The method as described in claim 1, wherein said generating a power consumption control parameter through a power consumption parameter calculation module according to the environment state result and the mode selection result comprises:

generating a power consumption control parameter through a power consumption parameter calculation module according to a preset speaker parameter, the environment state result and the mode selection result.

3. The method as described in claim 1, wherein the power consumption suppression module comprises a high-pass filter.

4. The method as described in claim 1, wherein the environment information acquisition device comprises a microphone.

5. The method as described in claim 1, wherein the environment state information comprises environment sound information, environment light brightness information, or environment temperature information.

6. The method as described in claim 1, wherein the environment state result comprises a low-frequency noise level of an environment.

7. The method as described in claim 1, wherein the power consumption control parameter comprises a high-pass filter cutoff frequency parameter.

8. An apparatus for controlling power consumption of a speaker, the apparatus comprising:

an acquisition module configured to acquire environment state information through an environment information acquisition device;

an environment state analysis module configured to analyze the environment state information to generate an environment state result;

a receiving module configured to receive a mode selection result input by a user;

a power consumption parameter calculation module configured to generate a power consumption control parameter according to the environment state result and the mode selection result; and a power consumption suppression module configured to control power consumption of a speaker according to the power consumption control parameter.

9. An electronic device, comprising:

a memory configured to store information comprising program instructions; and a processor configured to control execution of the program instructions;

wherein when the program instructions are loaded and executed by the processor, steps of a method for controlling power consumption of a speaker are implemented, wherein the method comprises:

acquiring environment state information through an environment information acquisition device;

analyzing the environment state information through an environment state analysis module to generate an environment state result;

receiving a mode selection result input by a user;

generating a power consumption control parameter through a power consumption parameter calculation module according to the environment state result and the mode selection result; and controlling power consumption of the speaker through a power consumption suppression module according to the power consumption control parameter.

* * * * *